United States Patent [19]
Blanchette et al.

[11] Patent Number: 5,181,148
[45] Date of Patent: Jan. 19, 1993

[54] SPINDLE MOTOR FOR REDUCED SIZE DISK DRIVE AND METHOD OF MAKING SAME

[75] Inventors: Gregory J. Blanchette, Palo Alto; Paul E. Jessee, San Jose, both of Calif.

[73] Assignee: Conner Peripherals, Inc., San Jose, Calif.

[21] Appl. No.: 546,182

[22] Filed: Jun. 28, 1990

[51] Int. Cl.⁵ ............................................. G11B 17/02
[52] U.S. Cl. ................................................ 360/99.080
[58] Field of Search ................. 360/99.08, 99.04, 98.07

[56] References Cited

U.S. PATENT DOCUMENTS 4,519,010  5/1985  Elsaesser ........................ 360/99.08
5,031,061  7/1991  Hatch ............................. 360/98.08

Primary Examiner—A. J. Heinz
Attorney, Agent, or Firm—Fliesler, Dubb, Meyer & Lovejoy

[57] ABSTRACT

A spindle motor for two and one-half inch disks and three and one-half inch disks has a disk mounting surface with a horizontal tolerance of less than 30 micro inch to prevent warpage of a disk mounted thereon by pressure engagement. The disk mounting surface is machined to the requisite tolerance by mounting an assembled motor on a support surface of a rigid granite block table and spinning the rotor of the motor by an external drive. A cutting tool then machines the disk mounting surface.

9 Claims, 3 Drawing Sheets

SPINDLE MOTOR FOR REDUCED SIZE DISK DRIVE AND METHOD OF MAKING SAME

BACKGROUND OF THE INVENTION

This invention relates generally to spindle motors for magnetic disk drives, and more particularly the invention relates to a spindle motor having the necessary tolerance for driving disks of three and one-half inch and two and one-half inch diameters.

The technology relating to data storage in magnetic disk drives is following a continuing trend towards increased data storage density, reduced data storage device weight and size, and reduced power consumption. Factors motivating these trends include the increasing use of portable, lap-top and note-book size computers.

The advances in data storage technology and the reduced size of computers have lead to disk drives having smaller dimensions. Eight inch disk drives were followed by five and one quarter inch disk drives, and the latest portable computers use three and one-half inch and two and one-half inch disk drives. The Kato series of two and one-half inch disk drives of Conner Peripherals, Inc. (Assignee) will have the approximate size of a deck of playing cards and weigh only 5.5 ounces yet will have a 21.4 mega byte formatted capacity.

As the disk drives become smaller in size and weight, so do the disks. The reduced thickness of the disks leads to problems of disk warpage in mounting the disks to the spindle motors, which in turn, leads to problems in storing and accessing data on the disk surfaces. Typically, a clamp spring biases a disk into engagement with a flange on the hub of the spindle motor. Unless the surface of the flange meets stringent tolerances, less than 30 micro inch for a two and one-half inch disk, the disk can suffer warpage when mounted thereto.

SUMMARY OF THE INVENTION

Accordingly, an object of the present invention is an improved spindle motor for use in smaller disk drives.

Another object of the invention is a spindle motor which can accommodate three and one-half inch and two and one-half inch disks without warpage of the disks.

Still another object of the invention is an improved method and apparatus for machining disk mounting flanges on spindle motors.

A feature of the invention is a spindle having a disk mounting flange with 30 micro inch surface tolerance.

Briefly, in accordance with a preferred embodiment of the invention a DC brushless spindle motor has a stator assembly including stationary coils, bearing means for rotatable supporting a rotor assembly, and a housing for the stator assembly including a support flange for mounting the stator assembly to a disk drive base plate. The motor further includes a rotor assembly including a shaft mounted to the bearing means, magnet means driven by the coils, and a hub mounted on the shaft. The hub further includes a disk mounting surface which is perpendicular to the axis of the shaft. A clip is fastened to the hub for maintaining a disk firmly on the disk mounting surface.

In machining the disk mounting surface to within the requisite tolerance, the housing of an assembled motor is positioned in a cavity of a rigid mounting fixture with the support flange engaging a support surface of the fixture. A mandrel is affixed to the hub which is then driven by suitable drive means whereby the rotor hub spins in the bearings of the motor. A cutting tool is then translated across the disk mounting surface to achieve the desired surface tolerance.

The invention and objects and features thereof will be more readily apparent from the following detailed description and appended claims when taken with the drawing.

DETAILED DESCRIPTION OF ILLUSTRATIVE EMBODIMENT

Figure 1A:
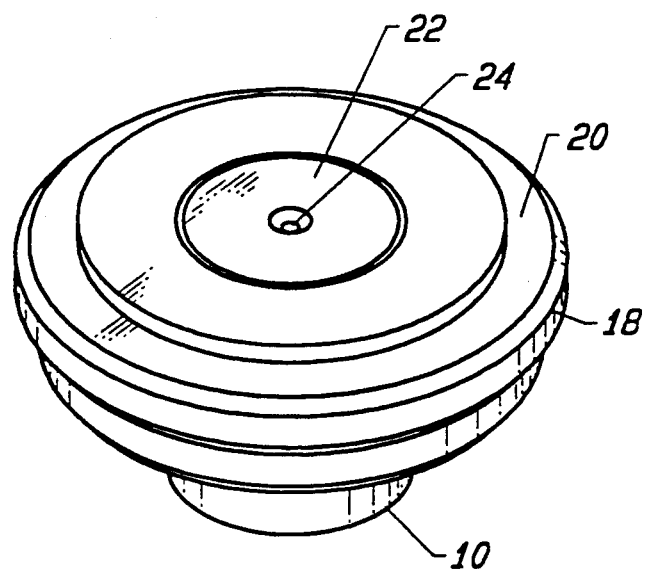
FIG. 1A and FIG. 1B are isometric views of a spindle motor in accordance with one embodiment of the invention.
Figure 1B:
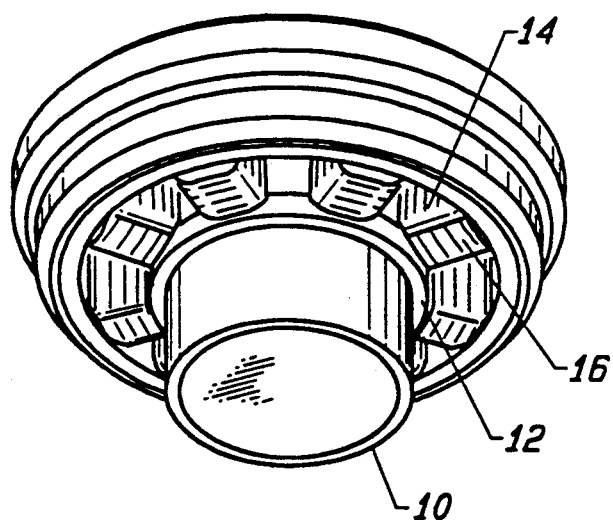

Referring now to the drawings, FIG. 1A and FIG. 1B are isometric views of a spindle motor in accordance with one embodiment of the invention. The motor includes a stator housing 10 having a mounting flange 12 thereon for mounting the spindle motor to the base plate of a disk drive. The stator further includes a plurality of stationary coils 14 which are mounted around laminations 16 for magnetically driving a rotor.

The rotor includes a hub 18 having a disk support surface 20 for receiving and supporting a disk. The hub is mounted to a shaft 22 which is mounted to bearings within the stator housing 10. In the center of the shaft 22 is a threaded hole 24.

Figure 2:
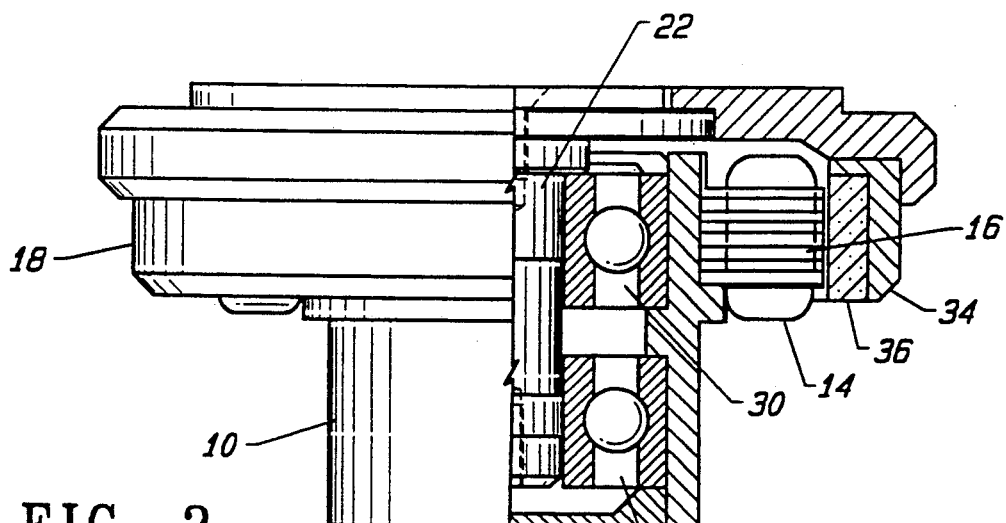
FIG. 2 is a side view partially in section of the motor of FIGS. 1A, 1B.

FIG. 2 is a side view partially in section further illustrating the construction of the spindle motor of FIGS. 1A, 1B. Within housing 10 are a pair of bearings 30, 32 in which the shaft 22 is mounted. Fastened to the housing 10 is a coil assembly including laminations 16 and coil 14. Mounted to the shaft 22 is the hub 18 to which is affixed a support ring 34 and a multi-pole magnet 36. When energized, the coils 14 rotatably drive the multi-pole magnet 36 and the spindle 18 which is mounted on the shaft 22.

Figure 3:
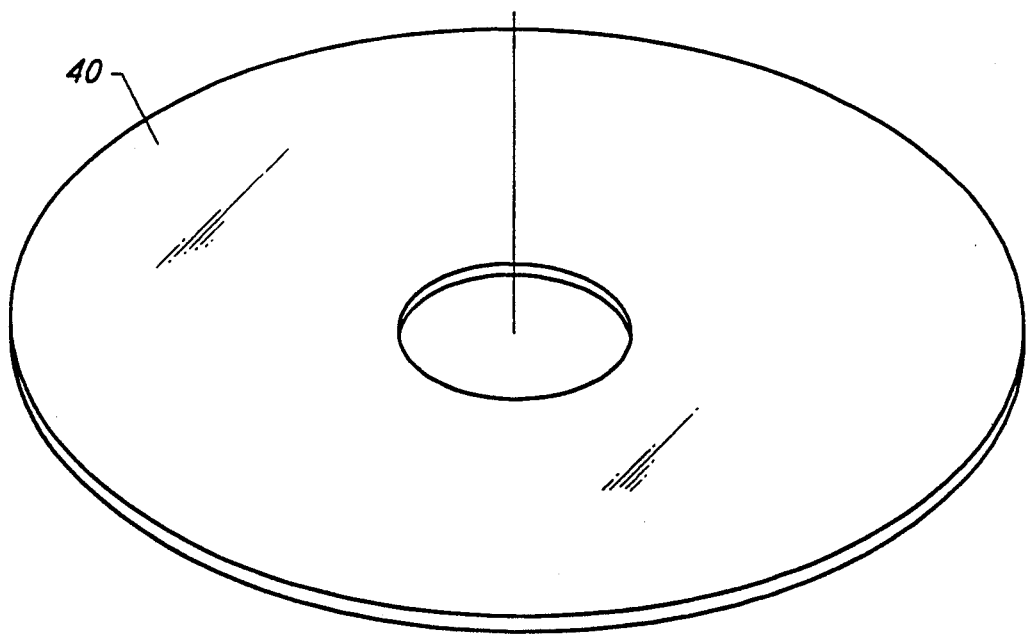
FIG. 3 is an exploded perspective view of the spindle motor of FIGS. 1A, 1B, a disk for mounting thereon, and a disk retaining clip.

FIG. 3 is an exploded isometric view of the spindle motor of FIG. 1A, 1B along with a disk 40 for mounting on the disk support flange 20 of hub 18 and a spring clamp 42 which is fastened to the shaft 22 by means of threaded screw 44 which threadibly engages hole 24 in the shaft. The clamp 32 is resilient and forcibly retains the disk 40 on the mounting surface 20 when the screw 44 is fully inserted into hole 24.

As noted above, the diameter and thickness of disks become smaller in size as the disk drives have become smaller. Consequently, the three and one-half inch and two and one-half inch disks can be warped when mounted by pressure fit on the disk support surface of the hub if the support surface is not machined to within a close tolerance. For the two and one-half inch disk, the surface tolerance must be within 30 micro inches between the inside diameter and outside diameter of the support surface. Heretofore, conventional machining practices have been able to produce a tolerance of no less than 50 micro inches. Due to the pressure engagement of the spring clamp in holding the disk on the mounting surface, some minute warpage can result in the disk which adversely affects the recording and reading of data on the disk surfaces.

Figure 4:
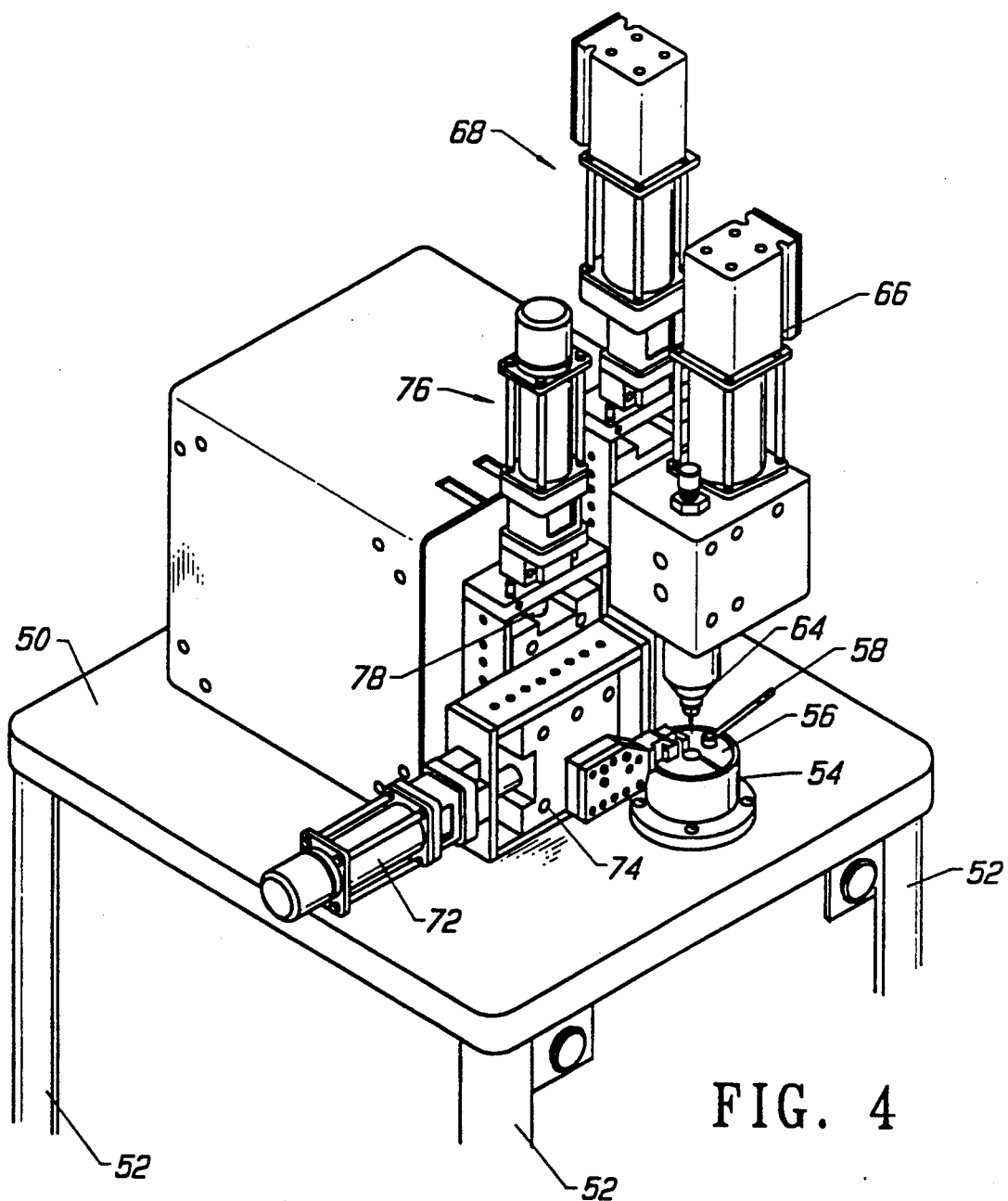
FIG. 4 is an isometric view of apparatus for milling a disk mounting flange in accordance with the invention.
Figure 5:
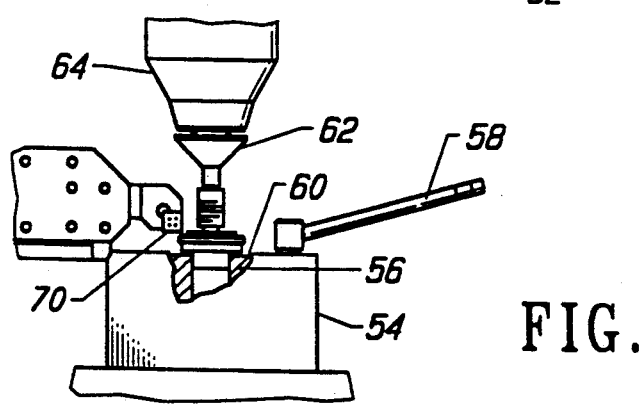
FIG. 5 is an enlarged view of the motor clamp, lathe, and cutting tool in the apparatus of FIG. 4.

In accordance with the present invention the disk mounting surface is milled to within the requisite tolerance by mounting an assembled spindle motor in a fixture and then rotating the rotor assembly on the bearings of the motor. A cutting tool is then translated across the disk mounting surface thereby providing a milled surface within the requisite tolerance. FIG. 4 is a perspective view of milling apparatus for carrying out the invention, and FIG. 5 is an enlarged view of an assembled motor in the mounting fixture and being rotated by a lathe for the machining with a milling tool. Referring first to FIG. 4, a granite block 50 is supported on a steel frame including legs 52 to provide a solid mounting base for the milling apparatus. The apparatus includes a mounting head 54 which has a cavity 56 for receiving the stator housing of a motor. Lever 58 extends from the fixture and actuates a cam action clamp in holding the stator housing in the cavity 56. As shown in FIG. 5, the fixture 54 includes a mounting surface 60 on which the support flange of the stator rests. A mandrel 62 is fastened to the rotor of the motor. The mandrel has a threaded end portion which is threaded into the screw hole 24 in the shaft of the rotor. Mandrel 62 is then received by a mating chuck shown at 64 which is driven by a lathe motor 66. The lathe 66 is moved vertically to engage the mandrel and release the mandrel by means of an up/down drive assembly shown at 68.

As the rotor and spindle are rotated on the motor bearings by means of lathe 66, a carbide tip cutting tool 70 is translated across the disk mounting surface 20 of the spindle. The cutting tool 70 is driven horizontally by a servo motor 72 through a lead screw 74, and the cutting tool 70 is translated vertically by means of a servo motor 76 and lead screw 78. The horizontal and vertical servo drives are rigidly mounted on the granite block by means of cross rollers.

In operation, after a motor is mounted in fixture 54 and clamped in place, the lathe 66 rotates the rotor. The cutting tool 70 is then translated across the disk mounting surface in a plurality of cutting steps. In milling a spindle motor for a two and one-half inch disk, three cuts are made with the first cut removing two one thousandth micro inch followed by 0.5 one thousandth micro inch and another 0.5 one thousandth micro inch. Tolerances of 30 micro inch or less have been consistently obtained.

There has been described a spindle motor having a disk mounting surface with a requisite tolerance for use in three and one-half inch and two and one-half inch disk drives. The method and apparatus for milling the disk mounting surface have proved to consistently provide the 30 micro inch tolerance required in such drives.

While the invention has been described with reference to a specific embodiments of spindle motors and milling apparatus, the description is illustrative of the invention and is not to be construed as limiting the invention. Various modifications and applications may occur to those skilled in the art without departing from the true spirit and scope of the invention as defined by the appended claims.

We claim:

1. In a spindle motor for a disk drive having a stationary coil assembly and housing, the housing having a support flange for mounting on a disk drive base plate and a rotor driven by said coil assembly and having a disk mounting surface, a method of machining said disk mounting surface to a desired tolerance comprising the steps of
    providing a rigid mounting fixture having a cavity for receiving said housing and a support surface for receiving said support flange,
    mounting said housing in said cavity with said support flange engaging said support surface,
    spinning said rotor of said spindle motor, and
    translating a cutting tool across the disk mounting surface to machine said disk mounting surface.

2. The method of machining as defined by claim 1 wherein said step of spinning said rotor assembly includes affixing a mandrel to said rotor, and driving said mandrel by drive means external to said spindle motor.

3. The method of machining as defined by claim 2 wherein said step of driving said mandrel includes providing a lathe having a chuck, and attaching said mandrel to said chuck.

4. The method of machining as defined by claim 3 wherein said rotor includes a shaft having a threaded hole for the attachment of a disk retaining clamp, said mandrel including a threaded end for engaging said threaded hole.

5. A spindle motor for a disk drive comprising
    a stator assembly including stationary coils,
    a housing for stator assembly including a support flange for mounting said stator assembly on a disk drive base plate, and
    a rotor assembly driven by said coils and having a disk mounting surface defined by an inside diameter and an outside diameter, said disk mounting surface being characterized by planar tolerance of less than 30 micro inches between said inside diameter and said outside diameter.

6. The spindle motor as defined by claim 5 wherein said stator assembly further includes bearing means for rotatably supporting said rotor assembly,
    said rotor assembly further including a shaft mounted to said bearing means, magnet means driven by said coil assembly, and a hub mounted on said shaft, said disk mounting surface being a surface of said hub which is perpendicular to the axis of said shaft.

7. A spindle motor having a stator assembly including stationary coils, a housing for said stator assembly including a support flange for mounting said stator assembly on a disk drive base plate, and a rotor assembly driven by said coils including a hub having a disk mounting surface, said disk mounting surface being machined to a desired tolerance by the process of
    mounting said housing in a rigid mounting fixture with said support flange engaging a support surface of said fixture,
    spinning said motor assembly by drive means external to said motor, and
    translating a cutting tool across a disk mounting surface to machine said disk mounting surface.

8. The spindle motor as defined by claim 7 where in said step of spinning said rotor assembly includes affixing a mandrel to said rotor assembly, and driving said mandrel by drive means external to said spindle motor.

9. The spindle motor as defined by claim 8 wherein said rotor assembly includes a shaft having a threaded hole for the attachment of a disk retaining clip, said mandrel including a threaded end for engaging said threaded hole.

* * * * *